United States Patent

[11] 3,590,563

| [72] | Inventor | Franz Xaver Lenzer<br>Kleinkotz/Kreis Gunzburg, Germany |
|---|---|---|
| [21] | Appl. No. | 768,441 |
| [22] | Filed | Oct. 17, 1968 |
| [45] | Patented | July 6, 1971 |
| [73] | Assignee | Karl Mengele & Sohne<br>Gunzburg, Germany |
| [32] | Priority | Oct. 18, 1967 |
| [33] | | Germany |
| [31] | | P 15 82 358.2 |

[54] IMPLEMENT CARRIER
3 Claims, 6 Drawing Figs.

[52] U.S. Cl............................................. 56/11.7,
56/61, 56/15.9
[51] Int. Cl............................................. A01d 45/02
[50] Field of Search............................................. 56/15, 16,
24, 23, 27, 376, 60, 61, DIG. 9

[56] References Cited
UNITED STATES PATENTS

| 2,017,758 | 10/1935 | Kowalsky | 56/16 |
| 2,803,101 | 8/1957 | Lundell | 56/24 X |
| 2,849,850 | 9/1958 | O'Donnell et al. | 56/15 |
| 3,021,658 | 2/1962 | Mitchell | 56/15 |
| 3,023,561 | 3/1962 | Gustafson | 56/6 X |
| 3,103,090 | 9/1963 | Campbell | 56/6 |
| 3,229,451 | 1/1966 | Wenzel et al. | 56/24 X |
| 3,438,182 | 4/1969 | Kessler | 56/16 |

FOREIGN PATENTS

| 233,308 | 9/1963 | Austria | 56/24 |
| 1,202,557 | 10/1965 | Germany | 56/24 |
| 1,199,177 | 12/1959 | France | 56/24 |
| 6,616,064 | 5/1967 | Netherlands | 56/6 |

*Primary Examiner*—Louis G. Mancene
*Assistant Examiner*—J. A. Oliff
*Attorney*—McGlew and Toren ABSTRACT: An implement carrier includes a bracket member in a form of a tube which is adapted to be supported on a three point suspension to the rear of a tractor and to extend in a cantilever fashion to one side thereof so as to project outwardly from one of the wheels of the tractor. The tubular bracket member supports a transmission shaft which includes a bevel gear which is driven by a driving bevel gear from a rearwardly extending drive shaft of the tractor. The opposite end of the transmission shaft includes a claw coupling which may be engaged and disengaged with a counter coupling carried by an implement which is adapted to be towed by the tractor and driven thereby. The transmission shaft includes a coupling of a claw type which may be moved outwardly under the force of a biasing spring by a remote control mechanism to engage with the counter coupling of the implement.

PATENTED JUL 6 1971

Inventor:
FRANZ XAVER LENZER
By McGlew & Toren
Attorneys

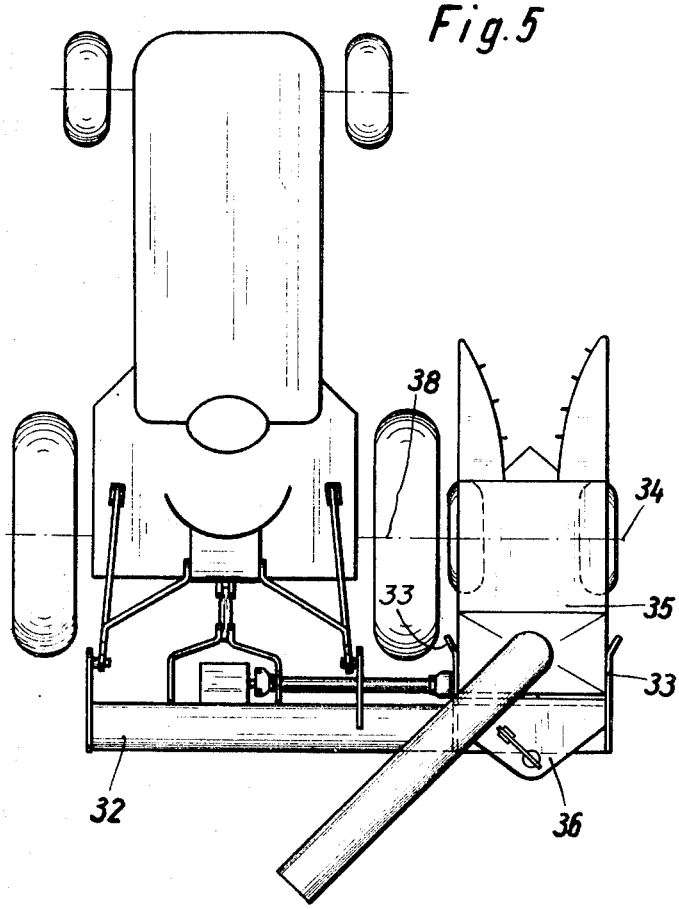

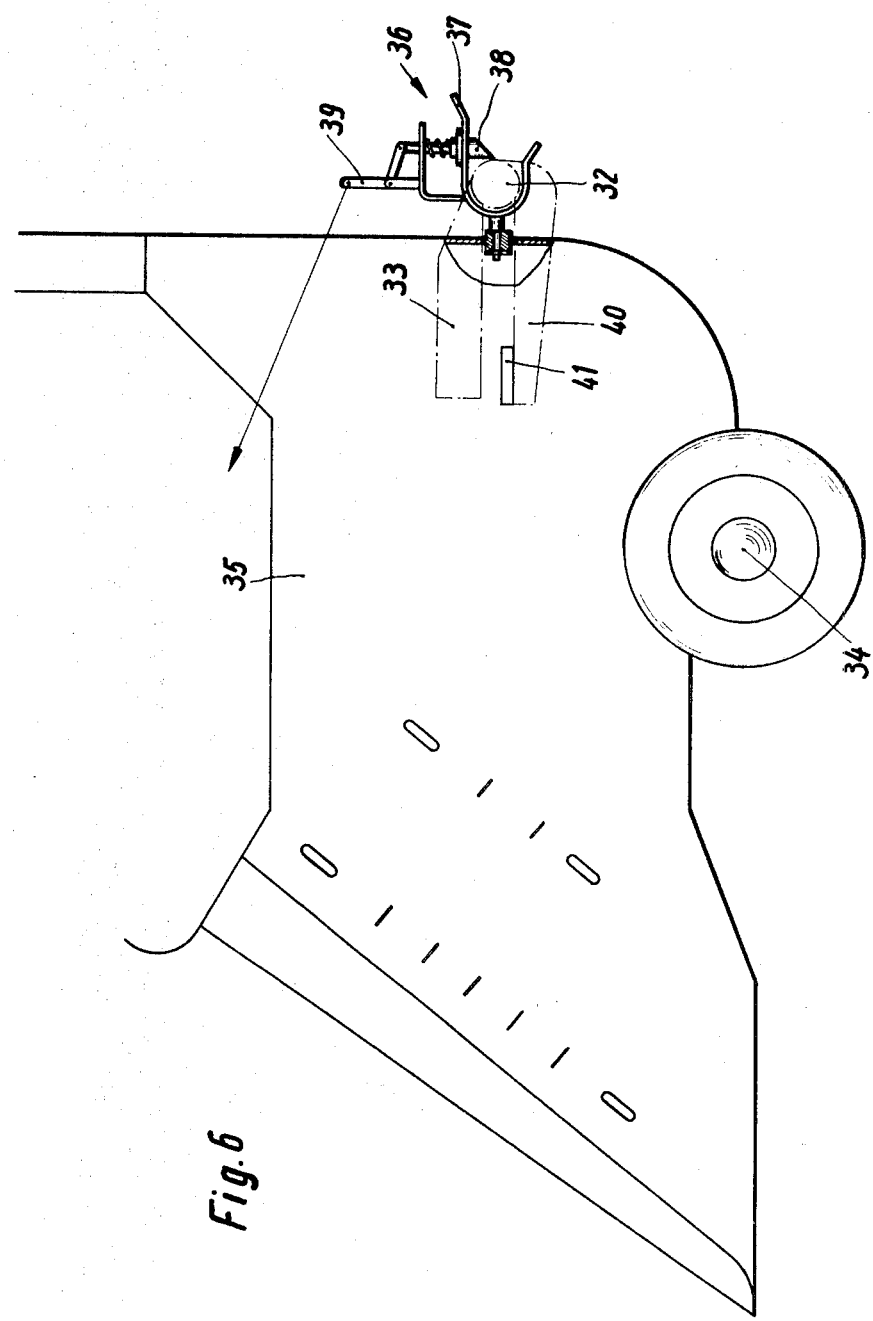

IMPLEMENT CARRIER

SUMMARY OF THE INVENTION

The invention relates to an implement carrier for hitch-up implements hitched laterally to the tractor, comprising a bracket with frame for hitching to the hydraulic system of the tractor, the bracket serving at the same time for the support of shafts transmitting the drive force.

The attachment of implements on the side of the tractor shortens the train (or line) and permits the unhitching of vehicles which take over, for example, the salvage material picked up by the implement.

The known implement carrier of the above described kind is used for the attachment of a chopper with corn teeth. The bracket here replaces the hitch bar and cantilevers laterally so that the chopper hangs outside next to the tractor wheel. Since the implement alongside the tractor is, as a rule, not suitable for road travel, it must be uncoupled. This is not possible with the vehicle attached, so that the latter must first be detached. Then the implement must be moved out of the roadway and the vehicle hooked on again. The recoupling is equally complicated and time-consuming. It is particularly difficult to carry out in the field. The invention has the purpose of eliminating these disadvantages. It is premised by the purposive concept to provide a rapid coupling actuable at all times.

The purpose of the invention is fulfilled by an implement carrier where the bracket and the transmission shaft are provided on the implement with rapid coupling elements and corresponding countercoupling elements are provided on at least one implement and the main drive thereof.

As coupling element of the kind according to the invention there enters into consideration a flange arranged at the connecting end of the bracket, the flange having assigned to it, at the implement, claws or drawer type guides, possibly with entering hood.

Another inventive principle consists in that a bracket according to the invention is provided with two plates laterally embracing a chopper arranged on its own riding axle and on the chopper at least one rearwardly open fork for the bracket is arranged and a snap bolt (or latch) for catching the bracket is provided. According to this design as per invention, the chopper is taken along next to the tractor in the manner of a sidecar. With this hitch arrangement the load on the tractor is particularly small.

For the rapid coupling as per invention, it is advantageous if the transmission parts are mounted in the bracket. A design is provided where a shaft is mounted in the bracket, the shaft being provided on one end with a miter gear with power takeoff and on the other end at the coupling point with a claw coupling or clutch.

According to a further idea of the invention, the coupling can be actuated with a shift lever which, if desired, may be connected with a remote control linkage or actuating cable braced on the bracket and frame.

The rapid coupling as per invention renders it possible to uncouple the implement also with the vehicle attached, and the possibility is conceived to assign several implements to the implement carrier as per invention for lateral attachment on the tractor. As implements of this kind there enter into consideration, for example, hay presses, beet toppers and the like.

Existing implements can be refitted for the attachment as per invention in a simple manner.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

FIG. 5 shows the top view of a hitching construction as per invention;

FIG. 6 shows a side view of the hitch arrangement as per FIG. 5.

Figure 2:
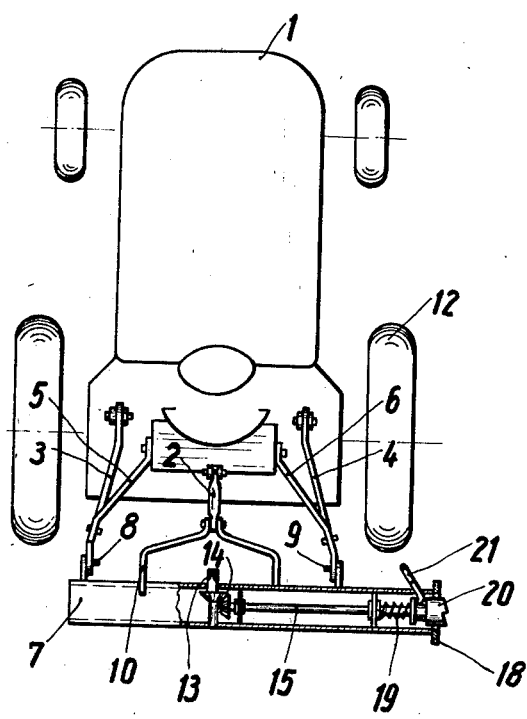
FIG. 2 shows a top view of FIG. 1, without implement.

As can be seen in FIG. 2, a tractor 1 has, at the rear, a three-point suspension consisting of an upper link 2, a lower left link 3, and a lower right link 4 and lift struts 5 and 6.

A pipe or bracket member 7 is coupled to the lower links 3 and 4 like a suspension bar with pins 8 and 9. The third coupling point is located on a frame 10 arranged on pipe 7, the frame being articulated to the upper link 2.

Figure 3:
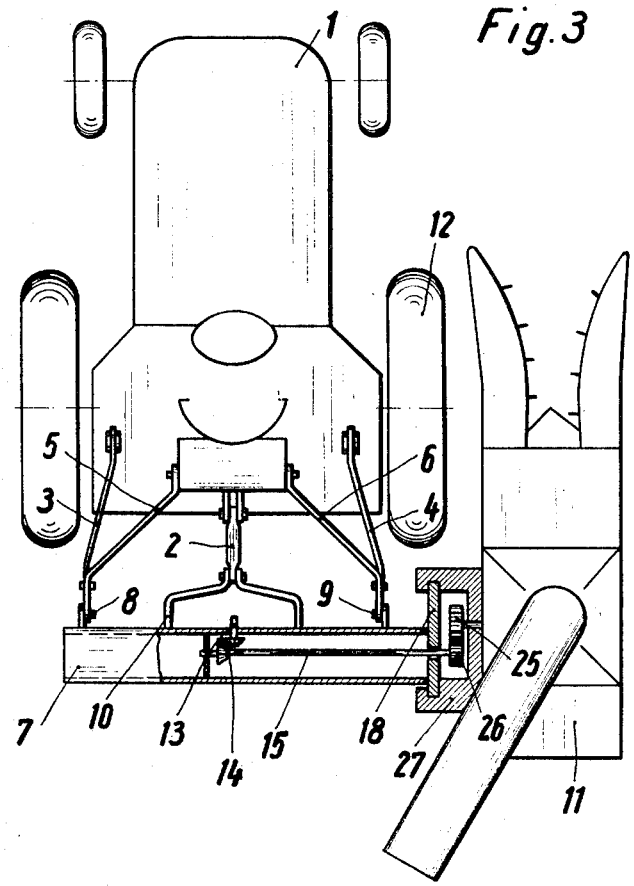
FIG. 3 shows a variant of the implement carrier as per invention, in top view.
Figure 4:
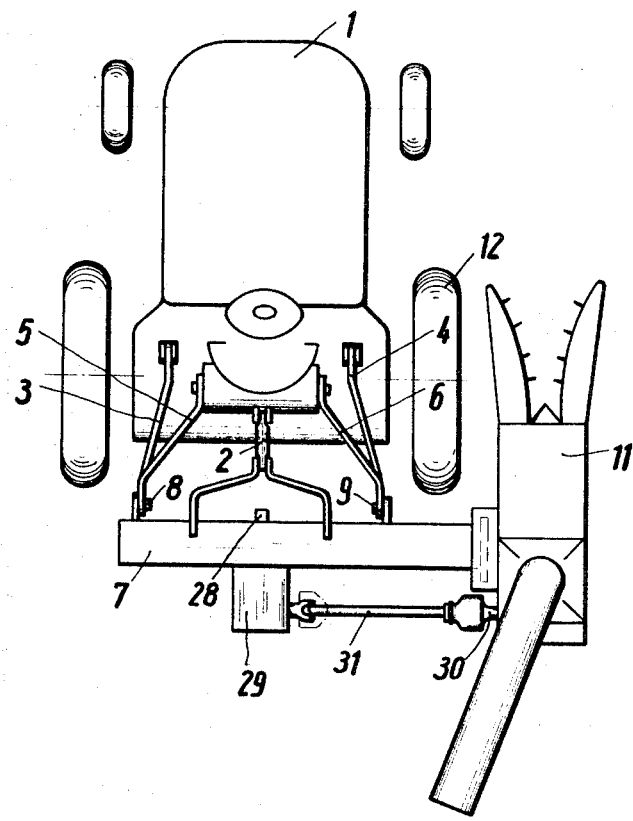
FIG. 4 shows another variant of the implement carrier as per invention, in top view.

On the right side, the pipe 7 cantilevers far enough that a chopper 11, as is illustrated in FIGS. 3 and 4, is guided laterally alongside the right tractor wheel 12.

The lateral suspension does not preclude that the implement, here the chopper 11, is supported on wheels while in operation.

Figure 1:
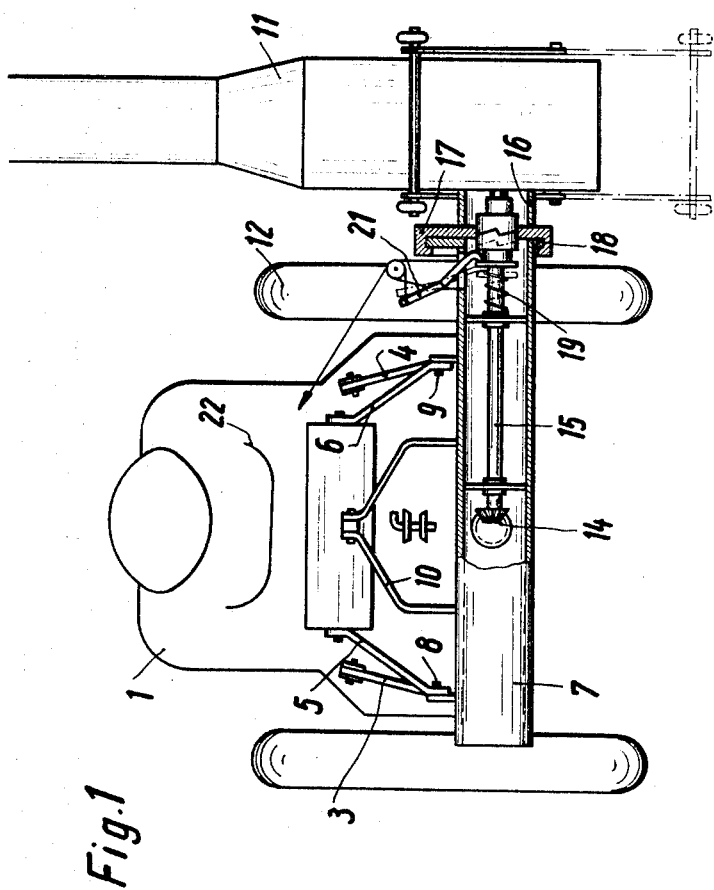
FIG. 1 shows an implement carrier as per invention, with implement, hitched to the rear of a tractor.

For the drive of the chopper 11 there is provided a power takeoff 13 indicated in FIG. 2, which drives a shaft 15 mounted in pipe 7 through bevel gear 14. The chopper 11 of FIG. 1 is provided with parts corresponding to the pipe 7 and shaft 15, namely, for pipe 7 the pipe connection 16, and for the shaft 15 a countershaft (not shown). The pipe connection 16 is provided with a clawlike guide 17 which embraces a flange 18 on pipe 7 in the coupled state. Guide 17 is so designed that the flange 18 to be inserted in it with play from one side and it is retained in the end position with a wedge fit.

A shift coupling 20 (FIG. 2) is axially slidable on shaft 15 and is engaged under the pressure of a spring 19. A shift lever 21 for the coupling 20 is actuable by cable line from the tractor seat.

A similar coupling of pipe 7 is illustrated in the example of construction in FIG. 3. The transmission coupling here consists in simple manner of a gear pair 25—26 which is accommodated in a guide housing 27. As the flange 18 is inserted into the guide of the guide housing 27, the gears 25 and 26 come into engagement with each other.

A variant is illustrated in FIG. 4. A power takeoff 28 passes through the pipe 7 and drives a bevel gear 29 arranged on the pipe 7. The bevel gear 29 is connectable with shaft end 30 of the chopper countershaft by a certain cardan shaft 31.

In FIGS. 5 and 6, another attachment principle according to the invention is illustrated. A similar tube bracket 32, otherwise designed as described above, is provided with hood-shaped plates 33 of FIG. 5 which laterally embrace a chopper 35 arranged on a riding axle 34. At the level of the bracket, the chopper 35 is provided with a takeup coupling 36, consisting of a rearwardly open fork 37 and a spring-loaded snap bolt 38. As the chopper 35 is pushed forward by the bracket 32, the latter is caught by the fork 37 and automatically coupled by the snap bolt 38. As can be seen in FIG. 5, the riding axle 34 is aligned with the tractor wheel axle 38, whereby a great maneuverability is ensured.

A remote control 39 is provided for releasing the snap bolt 38.

For lifting the chopper 35 by the hydraulic system of the tractor, there is provided on the bracket 32 an arm 40 which, upon rising, engages under a stop 41.

What I claim:

1. An implement carrier for hitching implements to a tractor having a system for lifting the implements, comprising a transversely extending bracket member, means on said bracket member for attaching said bracket member to the lifting system of the tractor and for suspending the bracket member to the rear of the tractor such that one end thereof extends outwardly from a side of said tractor, at least one laterally extending transmission shaft carried in said bracket and connected to means on the tractor for rotating said transmission shaft and having a driving exterior and extending to one side of said carrier, said transmission shaft having a coupling on said exterior end which is connected to an additional implement, and at least one implement located on the side of said tractor and having a driven shaft with counter coupling elements thereon engageable with the laterally extending coupling of said transmission shaft, said bracket member comprising a tube, said transmission shaft being rotatably mounted within said tube, bevel gear means on said transmission shaft within the interior of said tube for connecting said transmission shaft to drive means on said tractor, said tractor having a power takeoff extending rearwardly comprising a shaft extending rearwardly therefrom into said tube and including a bevel gear drivingly engaging said bevel gear means of said transmission shaft, said transmission shaft exterior end extending outwardly toward said implement including a movable claw coupling, and spring means biasing said claw coupling outwardly to engage said counter coupling means of said implement.

2. An implement carrier, according to claim 1, including a shift lever mounted on said bracket member engageable with said movable claw coupling, and remote control means connected to said shift lever to shift said movable claw coupling for engagement and disengagement with said counter coupling elements on said implement.

3. An implement carrier for hitching implements to a tractor having a system for lifting the implements, comprising a transversely extending bracket member, means on said bracket member for attaching said bracket member to the lifting system of the tractor and for suspending the bracket member to the rear of the tractor such that one end thereof extends outwardly from a side of said tractor, at least one laterally extending transmission shaft carried in said bracket and connected to means on the tractor for rotating said transmission shaft and having a driving exterior end extending to one side of said carrier, said transmission shaft having a coupling on said exterior which is connected to an additional implement, at least one implement located on the side of said tractor and having a driven shaft with counter coupling elements thereon engageable with the laterally extending coupling of said transmission shaft, at least two plates carried on said bracket member, said implement comprising a chopper laterally embraced by said plates, said chopper having its own riding axle, and at least one rearwardly open fork and snap bolt means for securing said bracket member to said chopper.